United States Patent
Henning

(10) Patent No.: US 6,338,521 B1
(45) Date of Patent: Jan. 15, 2002

(54) TARP COVER HOLD DOWN SYSTEM

(75) Inventor: Steven A. Henning, Anderson, IN (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 09/330,143

(22) Filed: Jun. 11, 1999

(51) Int. Cl.$^7$ ................................................. B60P 7/04
(52) U.S. Cl. ........................... 296/100.15; 296/100.14; 296/100.16; 296/98
(58) Field of Search ............................. 296/98, 100.14, 296/100.15, 100.16

(56) References Cited

U.S. PATENT DOCUMENTS

| | | |
|---|---|---|
| 2,594,910 A | 4/1952 | Germann |
| 3,168,345 A | 2/1965 | Roberts et al. |
| 3,498,666 A | 3/1970 | Harrawood |
| 3,515,428 A | 6/1970 | Killion |
| 3,549,197 A | 12/1970 | Sibley |
| 3,549,198 A | 12/1970 | Cappello |
| 3,549,199 A | 12/1970 | Sibley |
| 3,628,826 A | 12/1971 | Sibley |
| 3,759,568 A | 9/1973 | Unruh |
| 3,805,981 A | 4/1974 | Christensen |
| 3,841,697 A | 10/1974 | McFarland |
| 3,868,142 A | 2/1975 | Bachand et al. |
| 3,975,047 A | 8/1976 | McClellan |
| 3,977,719 A * | 8/1976 | Thurston ..................... 296/98 |
| 4,030,780 A | 6/1977 | Petretti |
| 4,050,734 A * | 9/1977 | Richard ........................ 296/98 |
| 4,082,347 A * | 4/1978 | Petretti ......................... 296/98 |
| 4,095,840 A | 6/1978 | Woodard |
| 4,126,351 A | 11/1978 | Peteretti |
| 4,341,416 A | 7/1982 | Richard |
| 4,505,512 A * | 3/1985 | Schmeichel et al. .......... 296/98 |
| 4,516,802 A | 5/1985 | Compton |
| 4,529,098 A | 7/1985 | Heider et al. |
| 4,717,196 A | 1/1988 | Adams |
| 4,740,029 A | 4/1988 | Tuerk |
| 4,874,196 A | 10/1989 | Goldstein et al. |
| 4,893,864 A * | 1/1990 | Bailey .......................... 296/98 |
| 5,031,955 A | 7/1991 | Searfoss |
| 5,058,956 A | 10/1991 | Godwin, Sr. |
| 5,096,250 A * | 3/1992 | Menz ........................... 296/98 |
| 5,125,713 A | 6/1992 | Willingham et al. |
| 5,174,625 A * | 12/1992 | Gothier et al. ................ 296/98 |

(List continued on next page.)

FOREIGN PATENT DOCUMENTS

GB      2027646      2/1980

Primary Examiner—Stephen T. Gordon
Assistant Examiner—Hilary Gutman
(74) Attorney, Agent, or Firm—Lawrence E. Laubscher, Sr.

(57) ABSTRACT

An improved tarp cover system for covering the open-topped container body of a vehicle, characterized by the provision of generally U-shaped inverted hold-down arm that is pivotally connected with the front wall of the container body and that is spring biased to apply a downward force on the front portion of the cover when the container is in the completely closed condition, thereby to reduce flapping of the cover during transport. The flexible tarp cover is wound on a roll that is rotatably supported adjacent the front wall of the container. In a first embodiment, to cover the container, the free end of the cover is displaced rearwardly of the container by a cover arm that is pivotally connected with the side walls of the container. The cover arm is biased toward its rearmost container covering position by a pair of side mounted spring arrangements that include compression springs that are concealed within the hollow leg portions of the cover arm. A locking arrangement is provided for automatically locking the cover arm in its rearmost position when the tarp completely covers the container. In an alternate embodiment, the cover is unwound from the roll by a transverse member that is manually pulled to the rear of the container by a pull rope. The cover is wound on the roll by an electric motor that is connected with the roll via a planetary gearing arrangement, or by a spring motor.

27 Claims, 10 Drawing Sheets

U.S. PATENT DOCUMENTS

| | | | |
|---|---|---|---|
| 5,238,287 A | | 8/1993 | Haddad, Jr. |
| 5,337,818 A | * | 8/1994 | Coad .......................... 296/98 |
| 5,380,058 A | | 1/1995 | Short et al. |
| 5,388,882 A | * | 2/1995 | Russell et al. ................ 296/98 |
| 5,482,347 A | | 1/1996 | Clarys et al. |
| 5,547,243 A | | 8/1996 | Lamb et al. |
| 5,573,295 A | * | 11/1996 | Haddad, Jr. ................. 296/98 |
| 5,658,037 A | | 8/1997 | Evans et al. |
| 5,697,663 A | | 12/1997 | Chenowth |
| 5,743,700 A | | 4/1998 | Wood, Jr. et al. |
| 5,829,819 A | | 11/1998 | Searfoss |
| 5,887,937 A | * | 3/1999 | Searfoss ..................... 296/98 |
| 5,944,374 A | * | 8/1999 | Searfoss ..................... 296/98 |
| 5,957,523 A | | 9/1999 | Haddad, Jr. |
| 6,053,556 A | * | 4/2000 | Webb ......................... 296/98 |

* cited by examiner

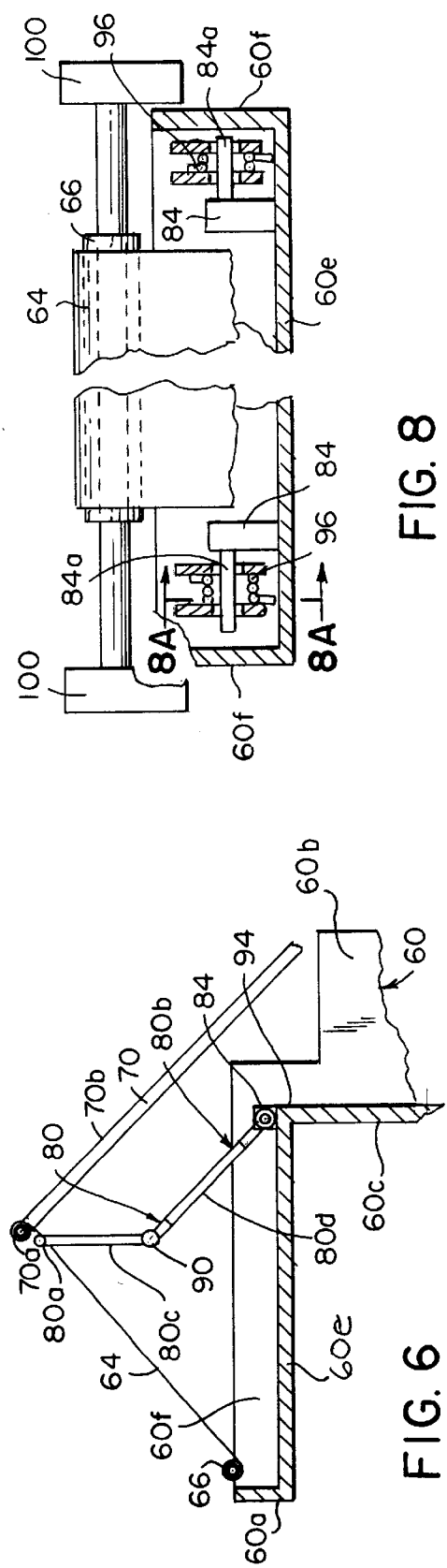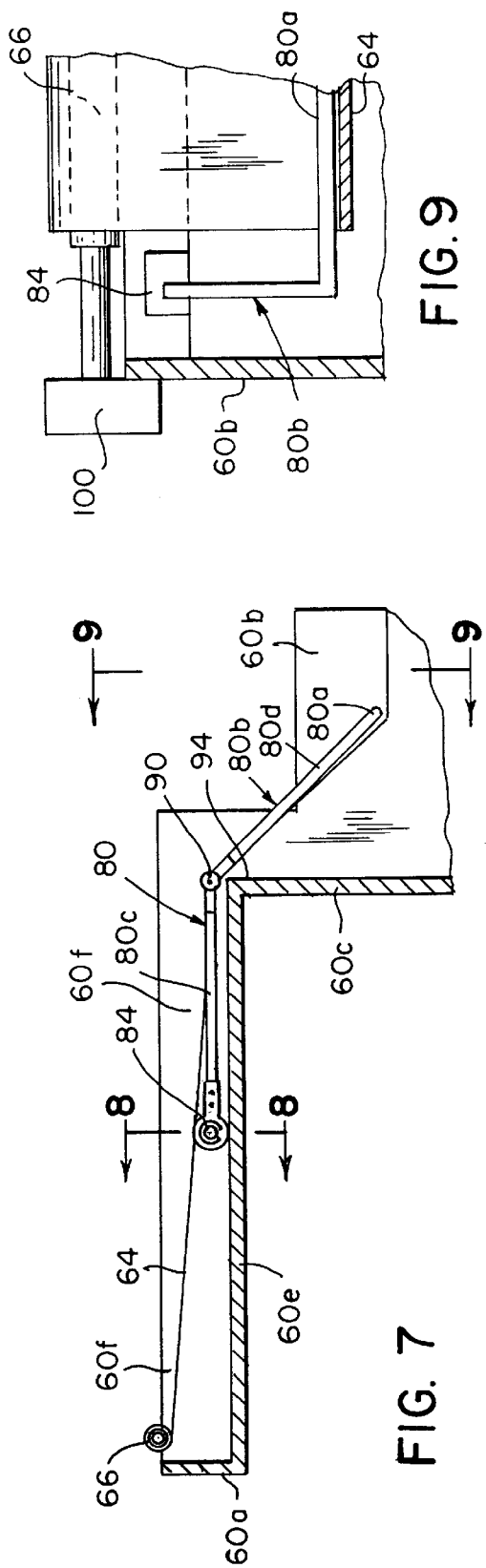

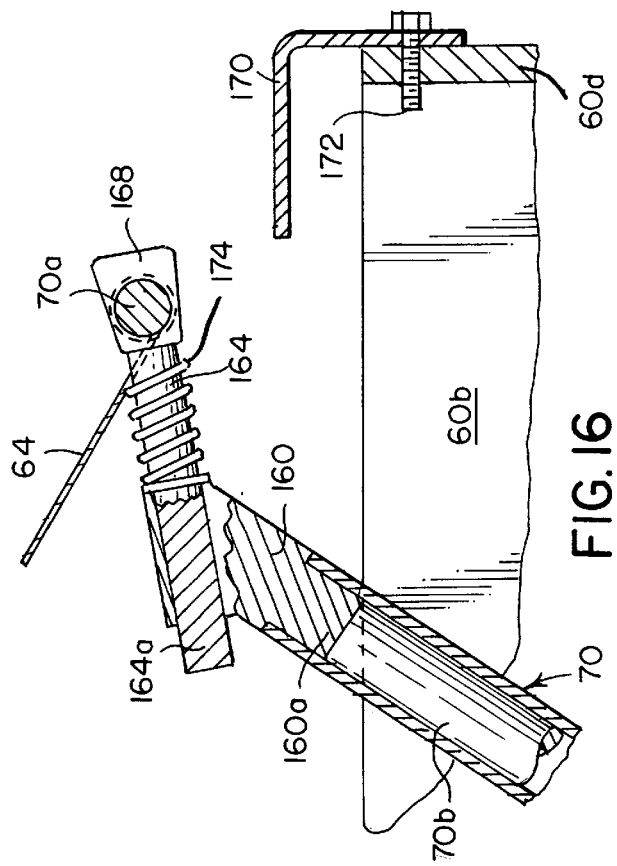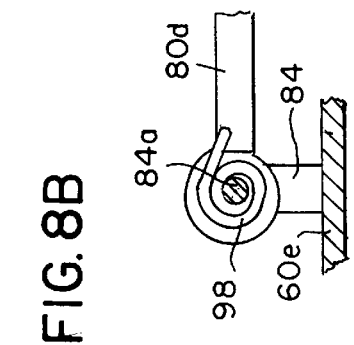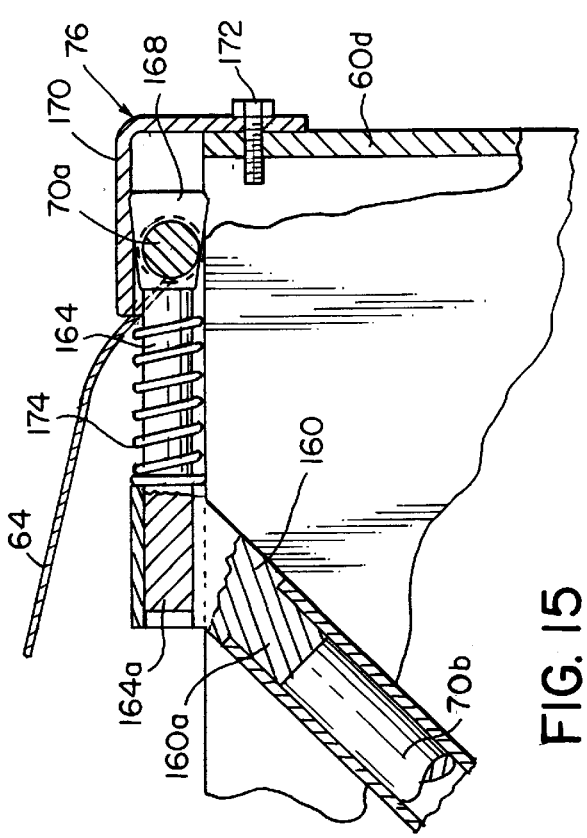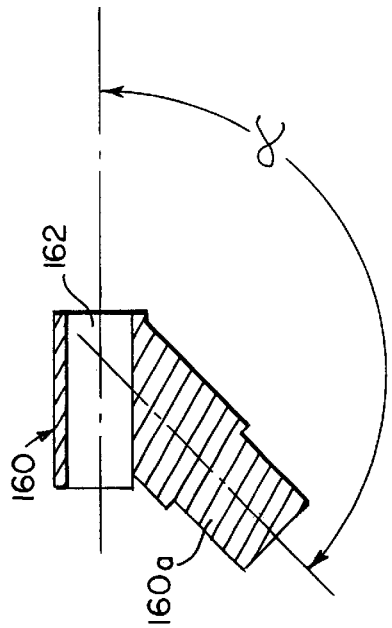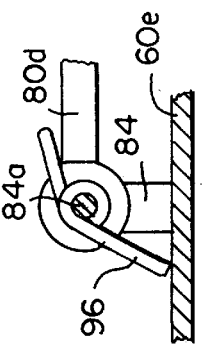

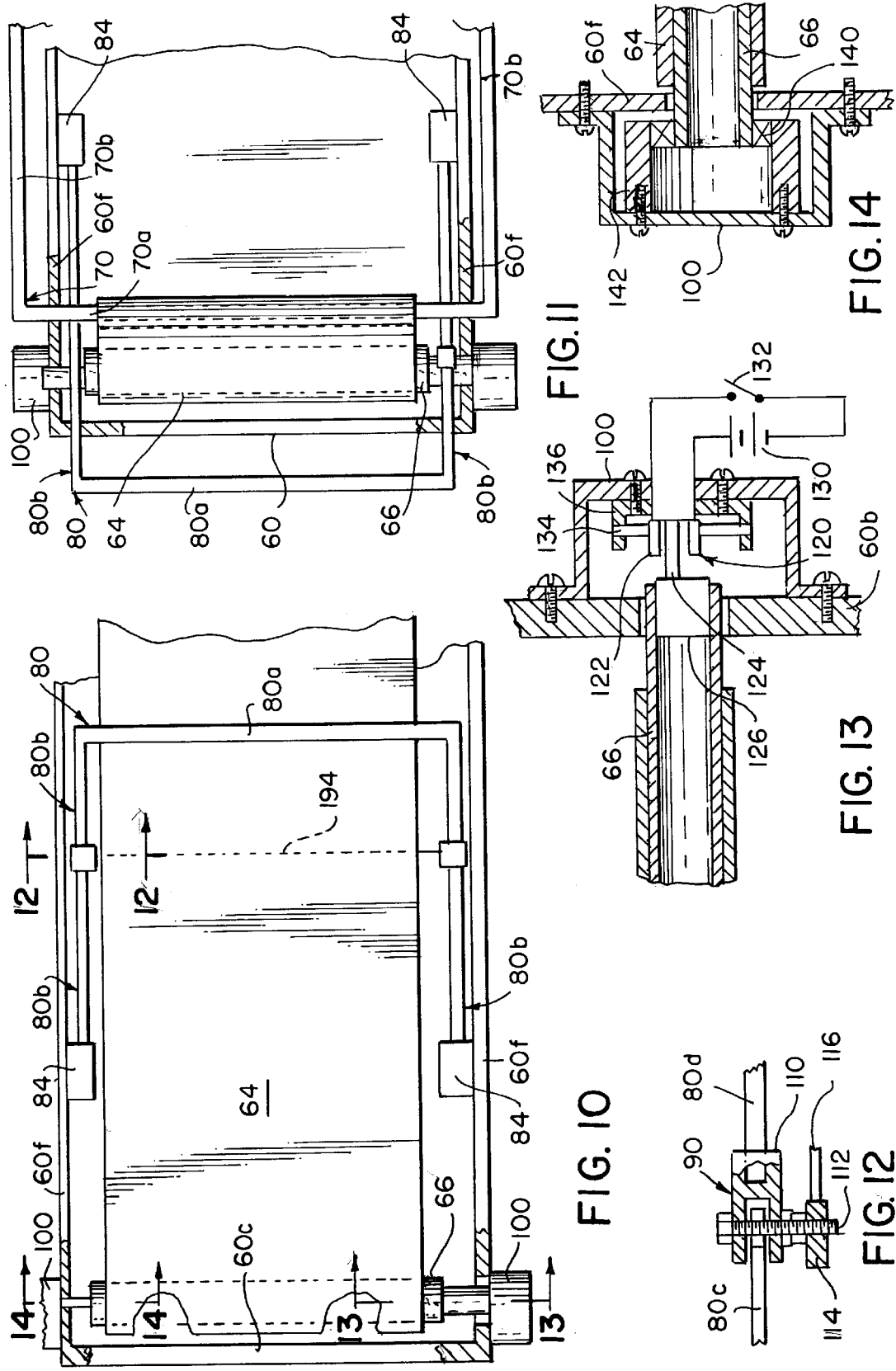

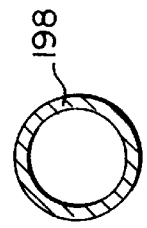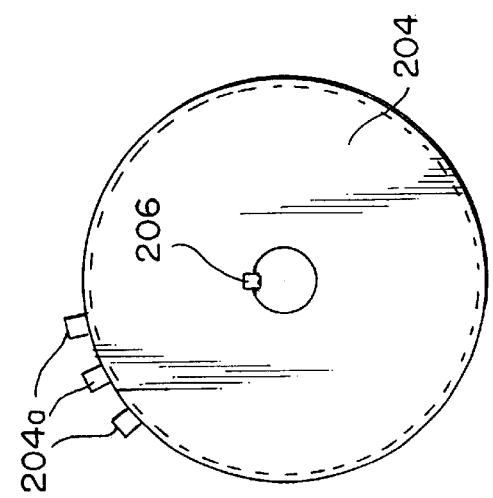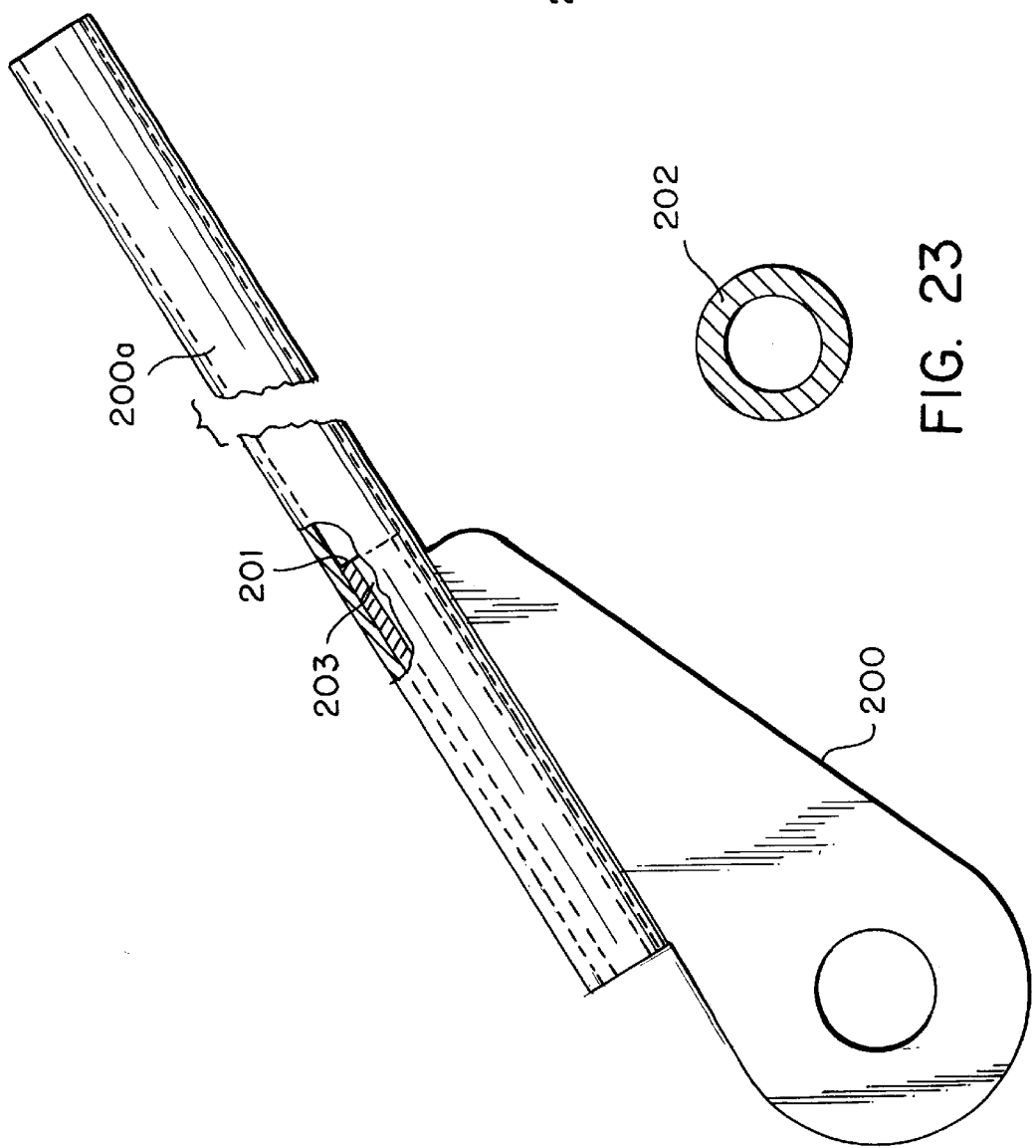

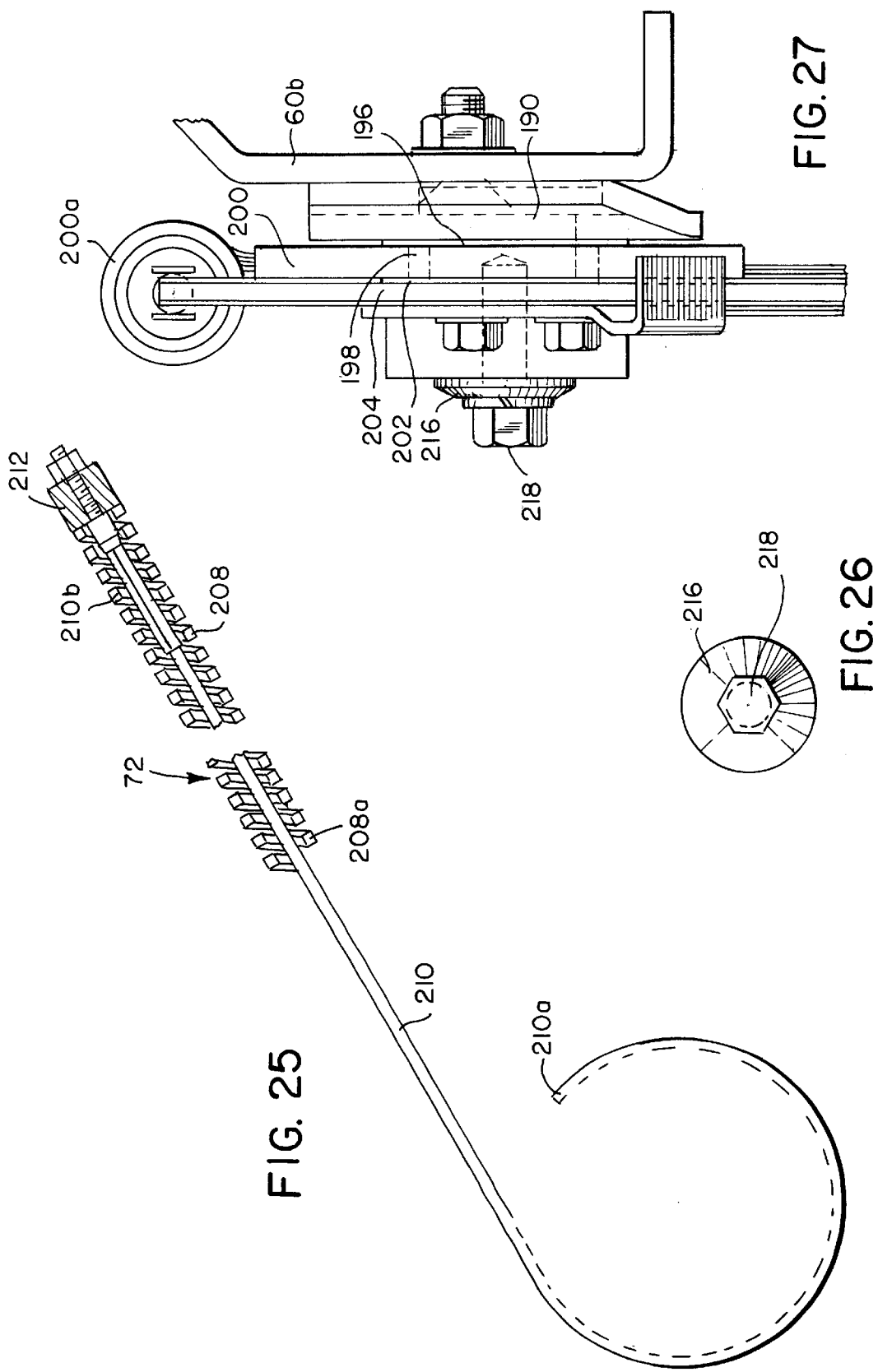

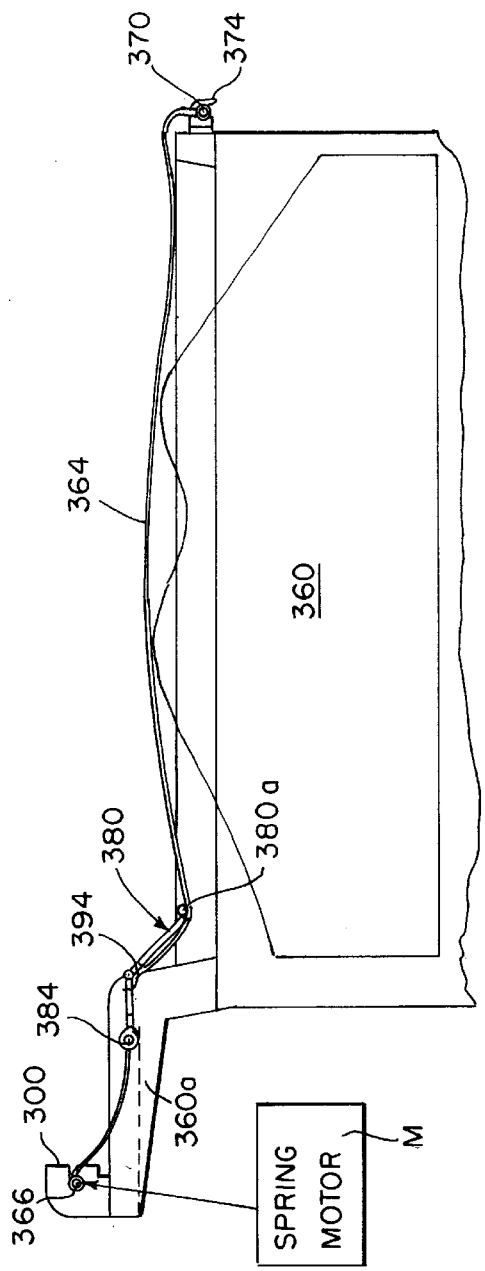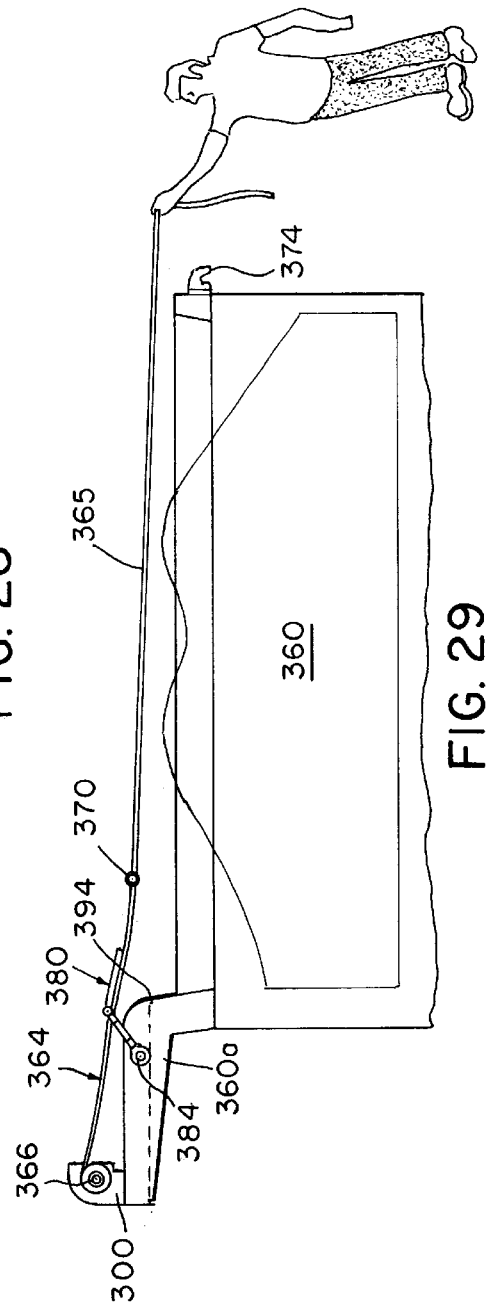

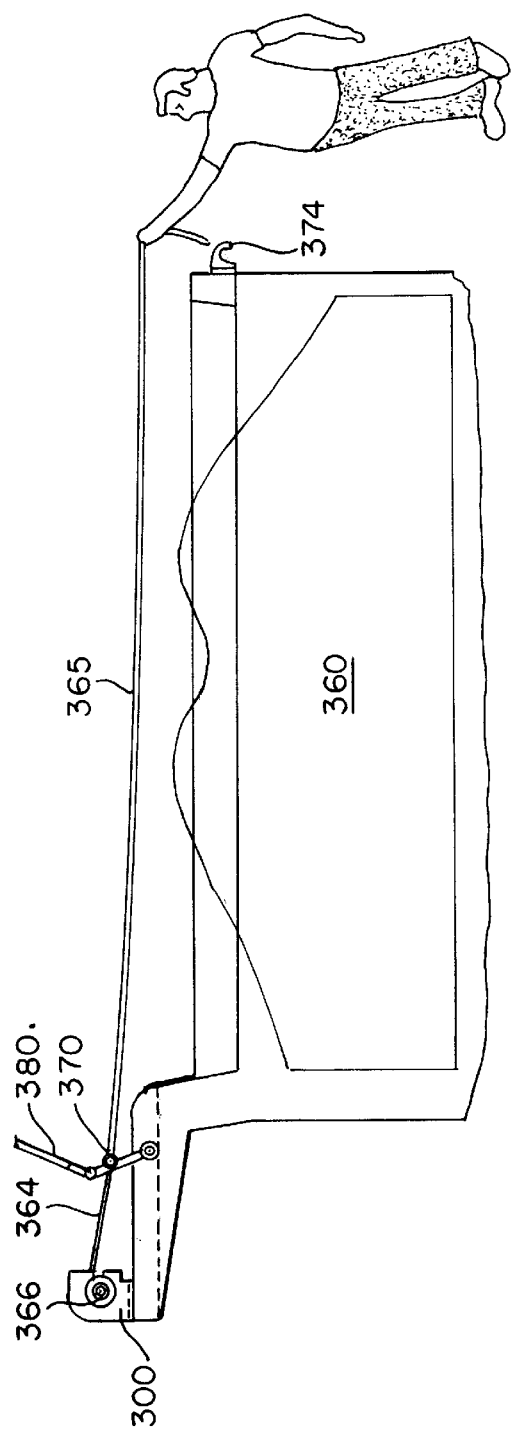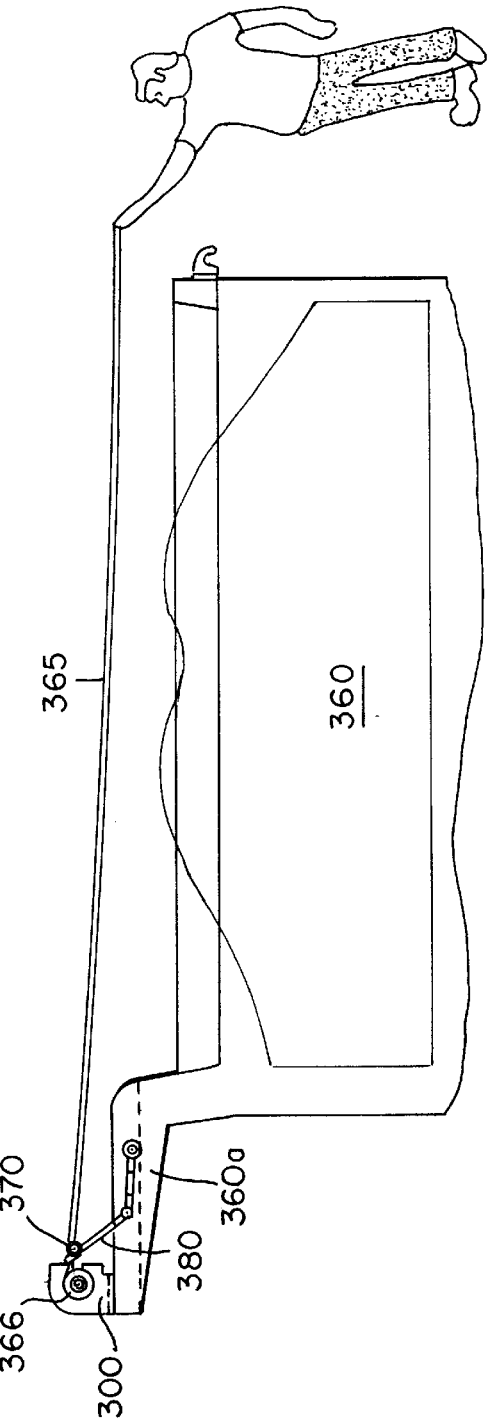

TARP COVER HOLD DOWN SYSTEM

BACKGROUND OF THE INVENTION

1. Field of the Invention

A tarp cover system for covering an open-topped vehicle container body includes a hold-down arm that is connected with the front end of the container body for applying downward tension upon the front end of the cover, thereby to reduce flapping of the cover during vehicle transport. The arm has a generally U-shaped inverted configuration and includes a transverse portion that is less than the width of the container body so that the arm can extend downwardly to some extent between the side walls of the container body.

2. Brief Description of the Prior Art

Tarp cover systems for covering the open-topped containers of dump trucks and trailers are well known in the patented prior art, as illustrated by the patents to Searfoss U.S. Pat. No. 5,031,955, Tuerk U.S. Pat. No. 4,740,029, and Compton U.S. Pat. No. 4,516,802, among others. The Tuerk patent addresses the problem of applying tension to the rear portion of the cover to tighten the same when in the container-covering condition, and in the Searfoss patent, tension is applied to the front portion of the cover by a hold-down arm that is pivotally connected with the main cover arm that straddles the container body arid is pivotally operable to cover and uncover the container body. In the Compton patent, the main cover arm that is pivotally connected with the container body is spring-biased toward the tarp covering position by exposed spring means.

The present invention was developed to provide an improved tarp cover system in which the hold-down means is operable independently of the cover arm and is operable to extend downwardly to some extent between the side walls of the container body, thereby to improve the hold-down functioning of the cover at the front end of the truck. The spring biasing means for the main cover arm are concealed in protected relation within the legs of the cover arm, and improved means are provided for automatically locking the cover to the container body when the cover arm is in its fully closed covering position. Improved drive-motor/gearing means serve to wind the tarp cover on the cover roll against the biasing force of the spring means.

SUMMARY OF THE INVENTION

Accordingly, a primary object of the present invention is to provide an improved tarp cover system for open-topped vehicle container bodies including a hold-down arm that is pivotally connected with the front end of the container body and is spring-biased to apply a downward tensioning force to the front end of the cover when the cover is in the container-covering condition.

According to a more specific object of the invention, the hold-down arm is of generally U-shaped inverted configuration and includes a transverse portion the length of which is less than the spacing distance of the side walls of the container body, whereby the hold-down arm can extend to some extent downwardly between the side walls, thereby to more positively tension and hold down the front portion of the tarp cover when the tarp is in the container-covering condition. Thus, when the hold-down arm is pivotally connected with the cab shield or ledge portion of a truck body that extends over the cab of the truck, the hold-down arm can be operated to tension the forward portion of the cover against the rear edge of the cab shield portion of the container body. thereby to assure positive hold down of the front portion of the tarp.

In accordance with a further object, the leg portions of the hold-down arm are sectional and include a plurality of angular adjustable sections, thereby to permit desired hold-down operation for various sizes and designs of the trucks with which the tarp cover system of the present invention is to be used.

According to another object of the invention, improved side mounted spring means are provided for biasing the main cover arm rearwardly toward its container-covering position, the spring biasing means including compression springs that are concealed within the hollow leg portions of the main cover arm.

A further object of the invention is to provide improved means for automatically locking the main cover arm in its container-covering position.

Still another object of the invention is to provide improved motor/gearing means for winding the tarp cover upon a roll against the biasing force of the side-mounted spring-biasing means associated with the main cover arm.

BRIEF DESCRIPTION OF THE DRAWINGS

Other object and advantages of the invention will become apparent from a study of the following specification, when viewed in light of the accompanying drawings in which:

FIG. 6 is a detailed sectional view of a first embodiment of the hold-down arm means of the present invention;

FIG. 7 is a detailed sectional view of a second embodiment of the hold-down arm means of the present invention;

FIGS. 8 and 9 are sectional views taken along lines 8—8 and 9—9, respectively, of FIG. 7;

FIG. 8A is a sectional view taken along line 8A—8A of FIG. 8, and FIG. 8B is a modification of the hold-down arm spring means of FIG. 8A;

FIG. 10 is a detailed top plan view of the hold-out arm means in the hold-down condition of FIG. 7;

FIG. 11 is a detailed top plan view of the hold-down arm means when maintained in its retracted position by the cover arm means;

FIGS. 12, 13, and 14 are detailed sectional views taken along the lines 12—12, 13—13, and 14—14, respectively, of FIG. 10;

FIG. 15 is a detailed sectional view illustrating the locking means for retaining the cover arm in its rearmost container body covering position;

FIG. 16 is a detailed sectional view illustrating the cover arm locking means in its disengaged condition;

FIG. 17 is a detailed sectional view of the aluminum casting member that forms the support member of the cover arm locking means;

FIG. 21 is a detailed view of the gusset and tube assembly of FIG. 18;

FIGS. 22 and 23 are sectional views of the bearing means of the thrust washer of FIG. 19, and FIG. 24 is an side view of the cast sheave of FIG. 18;

FIG. 25 is an elevational view of the cable and compression spring assembly of FIG. 19;

FIG. 26 is an elevational view of the washer and nut assembly of FIG. 19;

FIG. 27 is a side view of the cover arm biasing means of FIG. 19;

FIG. 28 is a diagrammatic view of a second embodiment of a tarp cover system using the hold-down means of the present invention when in the fully covered condition; and FIGS. 29–31 illustrate the successive steps for uncovering from the container the tarp cover of FIG. 28.

DETAILED DESCRIPTION

Figure 1:
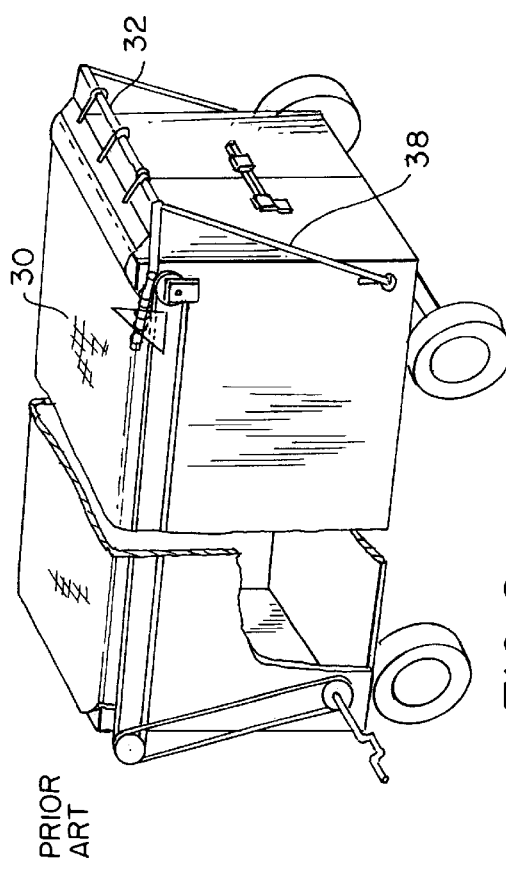
FIG. 1 is a side perspective view of a tarp cover system of the prior art, as illustrated by the Searfoss U.S. Pat. No. 5,031,955.

Referring first more particularly to FIG. 1 in the tarp cover system of the prior Searfoss U.S. Pat. No. 5,031,955, the tarp cover 2 for covering the truck body 4 includes a cover arm 6 having a generally U-shaped inverted configuration including a transverse portion 7 and a pair of leg portions 8 that extend downwardly adjacent the external surfaces of the side walls of the vehicle body. The lower free ends of the legs 8 of the cover arm are connected by pivot means 10 with the lower central portion of the vehicle body. In this system a second hold-down arm 12 is provided of generally U-shaped inverted configuration having a transverse portion 14 and a pair of downwardly extending leg portions 16 which are connected by pivot means 20 with the legs 8 of the main cover arm 6. Thus, when the cover arm 6 is pivoted rearwardly to the illustrated tarp covering position the cover 2 is progressively withdrawn from the roll 22 to completely cover the truck body, and the transverse portion 14 of the hold-down arm 12 is displaced to press the front portion of the cover downwardly adjacent the front end of the vehicle body.

Figure 2:
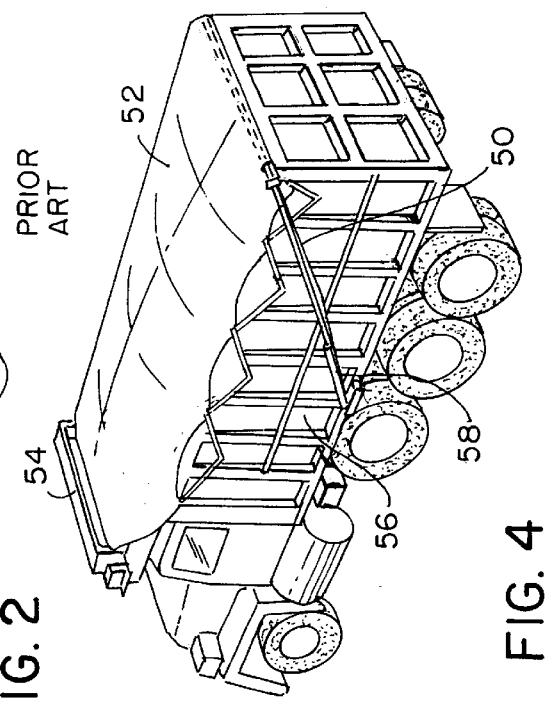
FIG. 2 is a rear perspective view of the truck tarp cover system of the Tuerk U.S. Pat. No. 4,740,029.
Figure 3:
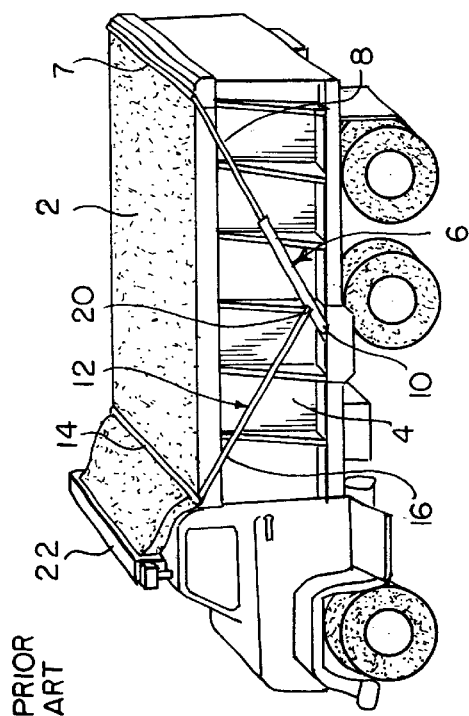
FIG. 3 is a detailed perspective view of the rear portion tarp cover system of FIG. 2.

Referring now to FIGS. 2 and 3, in the Tuerk U.S. Pat. No. 4,740,029, the rear end of the tarp cover 30 is tensioned by means of a generally U-shaped inverted tensioning arm 32 having leg portions that are pivotally connected with a carrier 34 by pivot means 40. When the rear end of the cover 30 and the carrier 34 are displaced rearwardly by the endless cable means 36, upon an application of force to the pull down ropes 38, the tensioning arm 32 is pivoted downwardly to apply tension to the rear portion of the cover as shown in FIG. 2.

Figure 4:
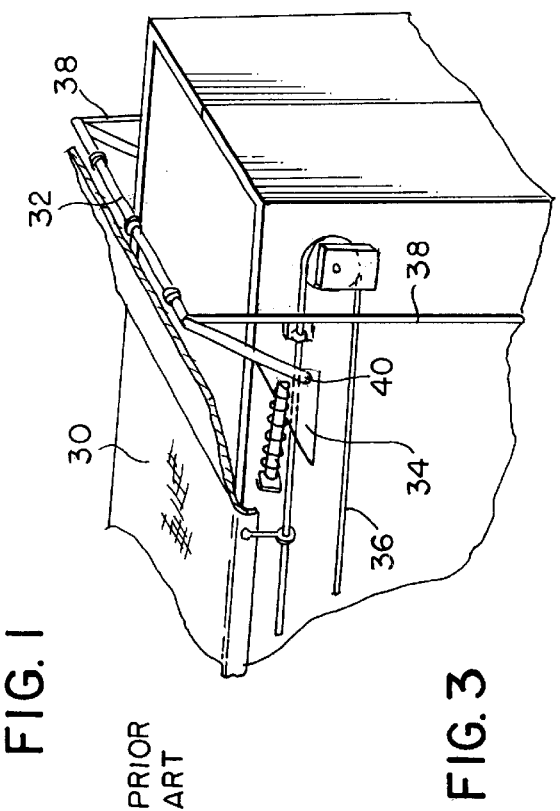
FIG. 4 is a rear perspective view of a tarp cover system of the prior art, as illustrated by the Compton U.S. Pat. No. 4,516,802.

Referring to FIG. 4, in the Compton U.S. Pat. No. 4,516,802, the pivotally connected generally U-shaped inverted cover arm 50 is biased rearwardly by the exposed spring means 58 toward the covering position illustrated in FIG. 4. The cover 52 is withdrawn from roll 54 to cover the cargo area contained between side walls 56.

Figure 5:
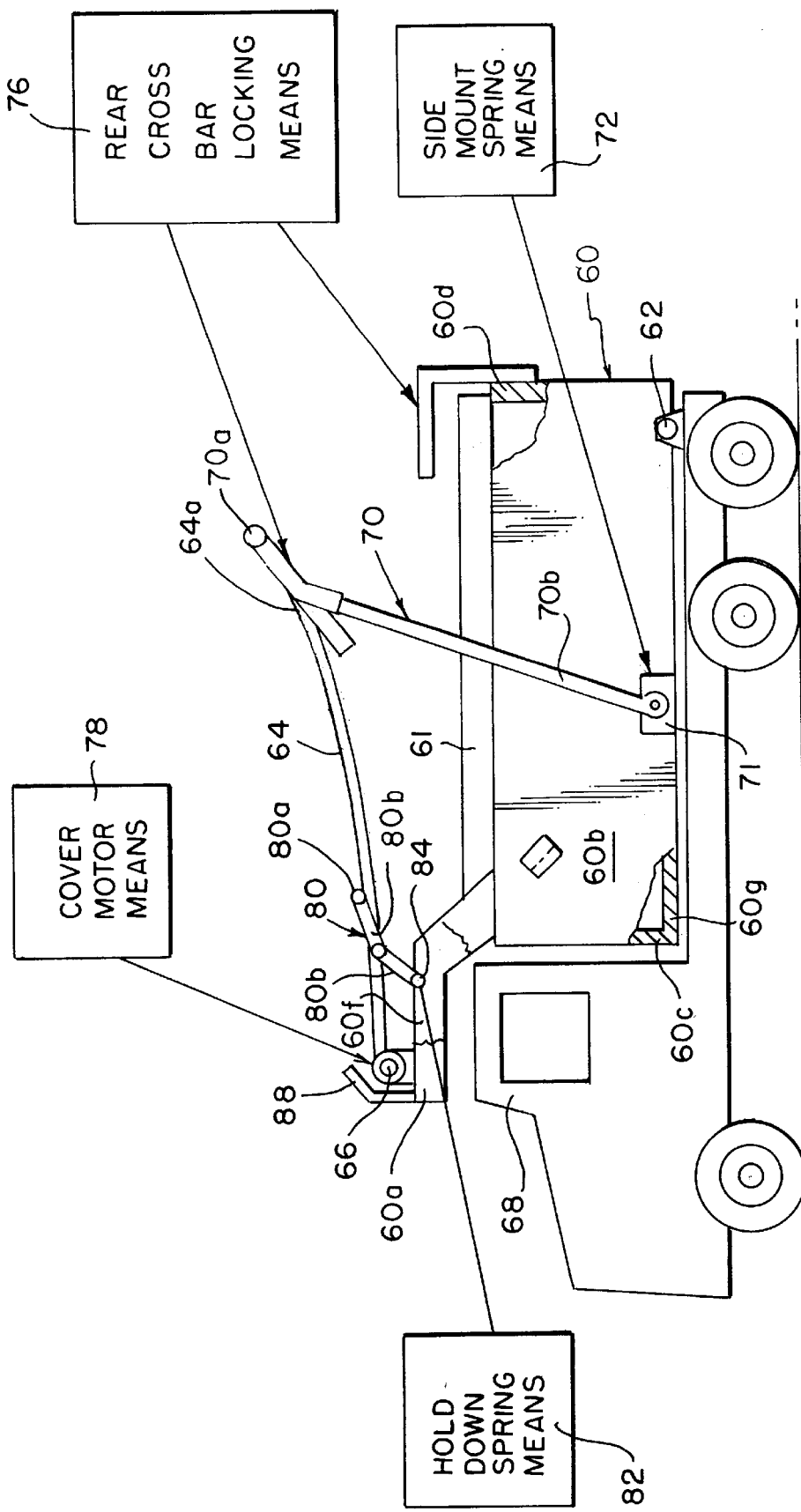
FIG. 5 is a side view of the improved tarp cover system of the present invention.
Figure 19:
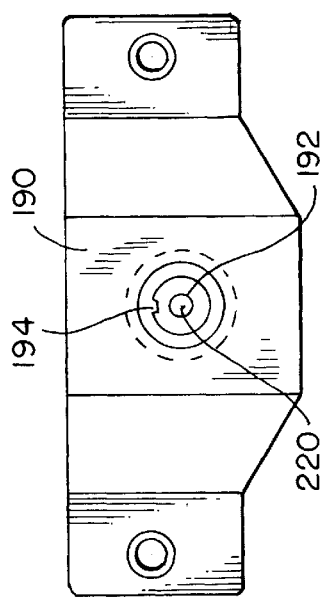
FIG. 19 is an side view of the bracket means of FIG. 18.
Figure 20:
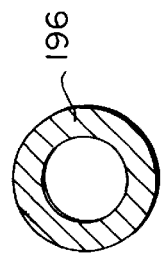
FIG. 20 is a sectional view of the thrust washer means of FIG. 18.

Referring now to FIG. 5, the tarp cover system of the present invention is operable to cover the open top of a vehicle container body 60 having a front wall 60c, a pair of side walls 60b, a bottom wall 60g, and a rear wall 60d. Wooden side rails 61 may be provided at the top of the side walls if desired. In the illustrated embodiment, the vehicle is a dump truck in which the vehicle body 60 is pivoted about pivot means 62 from its illustrated transport position to a tilted rear discharge position, as is known in the art. The tarp cover 64 is supplied from a roll 66 that is rotatably mounted on the container body cab shield portion 60a that extends above the cab 68. The cover arm 70 is of generally U-shaped inverted configuration (as shown in FIG. 11) having a pair of leg portions 70b that extend downwardly adjacent the external sides of the side walls 60b of the vehicle body 60, respectively. The free end 64a of the cover is connected with the transverse portion 70a (FIG. 11) of the tarp cover arm 70. At their lower ends, the leg portions 70b are pivotally connected with the lower central portion of the vehicle body 60 by pivot means 71 including side mount spring means 72, as will be described in treater detail below. The cover arm 70 is normally spring-biased rearwardly toward a first position in which the open-topped container body is completely covered by the tarp cover 64. As will be described in greater detail below, in accordance with a second feature of the invention, rear cross bar locking means 76 are provided for automatically locking the cover arm in its first tarp covering position, and according to a third feature of the invention, cover motor means 78 are provided for winding the cover on the cover roll 66, whereby the cover arm 70 is pivoted forwardly of the vehicle body 60 toward a retracted position illustrated in FIG. 11.

In accordance with a primary characterizing feature of the invention, spring-biased hold-down arm means 80 are provided for pressing down the forward portion of the cover 64 when the cover arm 70 is in its rearmost first position, thereby to apply a downwardly directed force to the front portion of the cover and thus prevent flapping of the forward portion of the cover during travel of the vehicle down a highway. The hold-down arm means 80 is of generally U-shaped configuration and includes a transverse portion 80a (FIGS. (10 and 11) and a pair of leg portions 80b that are pivotally connected at their lower ends with the cab shield portion 60a of the vehicle body by pivot means 84 that include the hold-down spring means 82, as will be described below. A conventional wind screen 88 is provided at the forward end of the cab shield portion 60a, thereby to shield the tarp cover roll 66 against the wind during travel of the vehicle.

Referring now to FIG. 6, the hold-down arm means 80 is pivotally connected with the container body by the pivot means 84 adjacent the rear edge 94 of the container body cab shield portion 60a. In accordance with an important feature of the invention each leg of the hold down arm means 80 is of sectional construction and includes a pair of leg sections 80c and 80d that are pivotally connected by the adjustment locking means 90.

Referring now to the modification of FIG. 7, the pivot means 84 for connecting the leg portions 80b of the hold down arm means 80 are connected with the bottom wall 60e of the cab shield portion 60a forwardly of the rear edge 94. As shown in FIGS. 7 and 10, the length of the transverse portion 80a of the hold-down arm means 80 is less than the spacing distance between the side walls 60b of the vehicle container body 60, whereby when the hold down arm means 80 is in the hold-down condition of FIG. 7, the transverse portion 80a extends between the container side walls 60b and is at an elevation lower than that of the rear edge 94 of the cab shield portion 60a, thereby to apply hold-down tension to the forward portion of the cover 64 when the cover arm 70 is in its rear most tarp-covering position.

Referring to FIGS. 8 and 9, the pivot support means 84 includes pivot pins 84a about which are pivoted the leg sections 80d of the hold-down arm means 80. Torsion spring means 96 bias the hold-down arm means 80 in the clockwise direction toward the hold-down position illustrated in FIGS. 7 and 9. In the embodiment of FIGS. 8 and 8a, the torsion springs 96 react between the cab shield bottom wall 60e and the hold-down leg section 80d. In the modification of FIG. 8B, each of the spring means 98 is a spiral spring that reacts between the pivot pin 84a and the section 80d of the hold-down arm means 80. The tarp cover roll 66 is rotatably supported at each end by support means 100 connected with the cab shield side walls 60f, as will be described below.

Referring to FIG. 12, the adjustment locking means 90 for pivotally connecting and locking the leg sections 80c and 80d of the hold-down arm means 80 include a bifurcated member 110 that receives the pivot pin 112 about which the section 80c pivots. Upon tightening of the nut 114 upon the threaded pivot pin 112 by the handle means 116, the sections 80c and 80d are adjustably locked in any desired relative orientation.

Referring now to FIGS. 13 and 14, in accordance with an important feature of the invention, the tarp cover roll 66 is rotatably driven by a 12 volt direct-current motor 120 having a stator 122 that is connected with the housing support means 100, and a rotor 124 that is connected with the cover roll 66 by planetary gearing means 126. One example of the motor 120 is the known SOMFY LT motor produced by Somfy Systems, Inc., of Cranbury, N.J. The motor/planetary gearing assembly is electrically driven by the battery 130 in accordance with the actuating position of switch means 132. The motor 120 is supported from the housing support means 100 by means of support pins 134 and bracket 136, as shown in FIG. 13. At its other end, the tarp cover roll 66 is supported by bearing means 140 and mounting, bracket 142.

In accordance with another feature of the invention shown in FIGS. 15–17, lock means 76 are provided at the rear wall 60d of the vehicle body 60 for automatically locking the cover arm 70 in its rearmost container-covering first position. To this end, the transverse portion 70a is connected with the leg portion 70b by a self-locking assembly including a pair of cast aluminum fittings 160 each having a plug portion 160a adapted for insertion within the associated tubular end portion of the leg portion 70b. At its other end, the fitting 160 contains an angularly-arranged through bore 162 that is arranged at the acute angle α and which slidably receives the associated end portion 164a of the connecting rod 164. The other end of the connecting rod is connected with the cover arm transverse portion 70a via a locking member 168 that supports the transverse portion for insertion within a corresponding L-shaped bracket 170 that is bolted to the rear wall 60d by bolt means 172. A compression spring 174 is mounted concentrically about each connecting rod 164, which spring is captured between the fitting 160 and the locking member 168. As shown in FIG. 16, when the motor means 78 is actuated to roll the tarp cover 64 on the roll 66, the tension of the cover causes connected rod 164 and the transverse portion 70a to be displaced to the left relative to each cover arm fitting 160, thereby to compress the compression spring 174 as shown in FIG. 16. The locking member 168 is thereby retracted to withdraw the transverse portion 70a from its position within the L-shaped locking brackets 170, whereupon the cover arm 70 is released for pivotal displacement toward its second retracted position in which the cover 64 is rolled upon the roll 66. During the covering operation, the cover arm 70 is biased in the clockwise direction toward its fully covered position shown in FIG. 16, whereupon the cover motor means 78 is deactivated, the tension on cover 64 is released and compression spring 174 expands to displace the locking member 168 beneath the locking bracket 170, as shown in FIG. 15.

Thus, the rear end of the cover 64 and the cover arm 70 are stabilized by the rear cross bar locking means 76.

Referring now to FIGS. 18–27, in accordance with a further object of the present invention, the leg portions 70b of the tarp cover arm 70 are pivotally connected with the lower central side portions of the vehicle body by pivot means 71 centrally arranged adjacent the bottom wall 60g of the vehicle body 60. Each of the pivot means on opposite sides of the vehicle body includes a bracket 190 (FIG. 19) supporting a pivot pin 192 containing a key slot 194. Successively mounted on the pivot pin 192 are a thrust washer 196 (FIG. 21). a bearing 198 (FIG. 22) upon which is rotatably mounted a gusset and tube assembly 200 (FIG. 23), a second thrust washer 202 (FIG. 23), and a stationary sheave 204 (FIG. 24) that is keyed to the pivot pin 192 by the key 206. Mounted within the tubular portion 200a of the gusset and tube assembly 200 is a compression spring 208 (FIG. 25) the lower end 208a of which is seated on the upper edge 201 of a second tube 203 that is inserted concentrically within the tubular portion 200a of the gusset and tube assembly 200. Extending concentrically through the compression spring 208 is a cable member 210 that extends around the circumference of the sheave 204 and has an end portion 210a that is clamped to the sheave 204 by clamping means (not shown). The other end 210b of the cable is connected with a piston 212 that rides within the tubular portion 200a of the gusset and tube assembly 200. Preferably, the gusset and tube assembly 200 is formed of a hard metal, such as steel. Finally, a washer 216 and bolt 218 are provided for bolting the parts to the threaded bore 220 contained in the pivot pin 192, as shown in FIG. 27.

Figure 18:
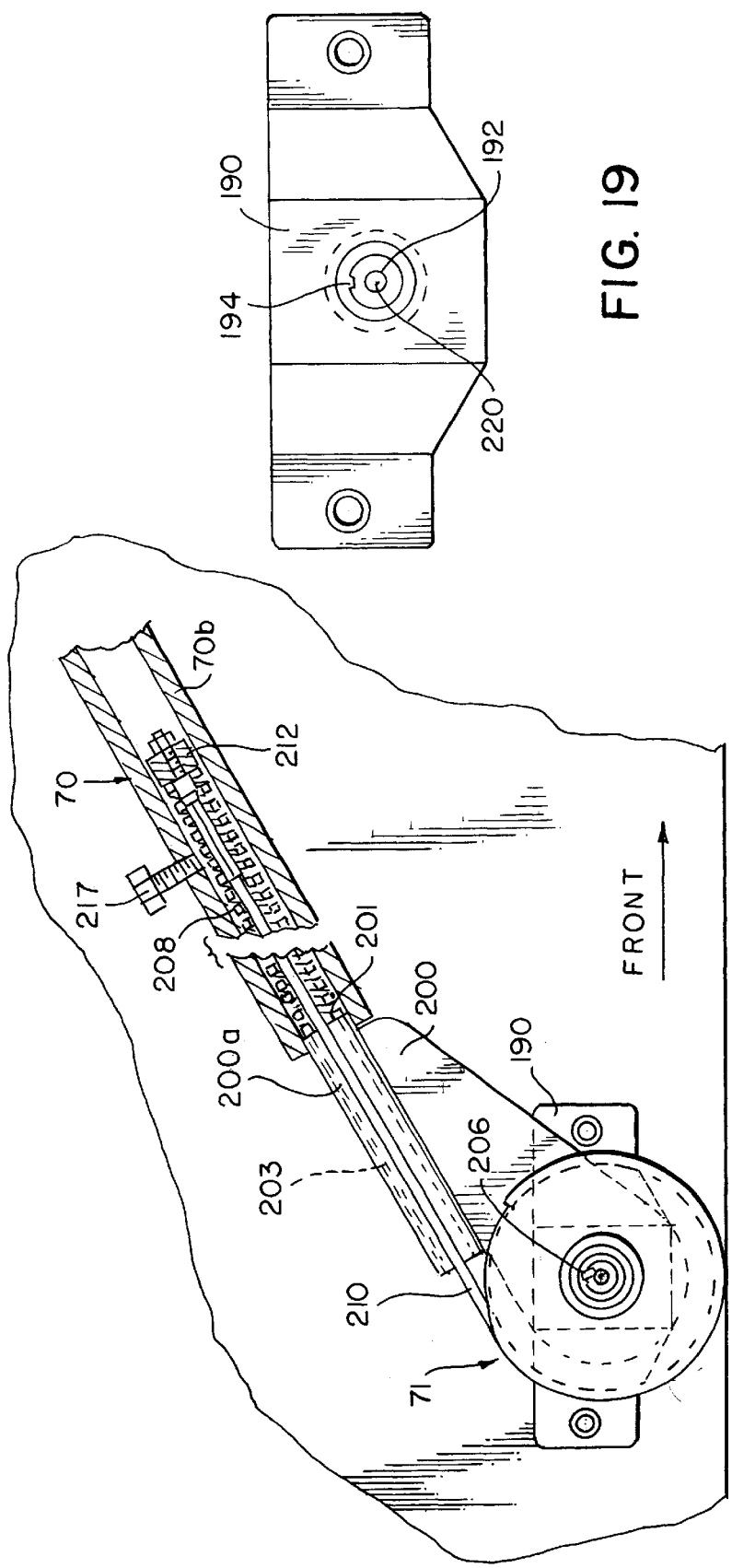
FIG. 18 is a detailed sectional view illustrating the cover arm spring biasing means on the passenger side of the vehicle when in the spring-compressed condition.

Referring again to FIG. 18, assume that the pivot means 71 is on the passenger side of the vehicle, and that the tarp cover arm 70 has been pivoted forwardly toward its second vehicle body uncovering position, whereupon the spring 208 is in a compressed condition owing to the pivotal movement of the gusset and tube assembly 200. The tubular steel portion 200a of the gusset 200 extends concentrically within the lower end of the tubular leg portion 70b of the tarp cover arm 70. The tarp cover arm 70 is normally made of a soft material such as aluminum, or a suitable synthetic plastic material. Set screw 217 secures the lower end of the leg portion 70b with the tubular portion 200a of the stainless steel gusset 200. As shown in FIG. 18, the compression spring 208 is concealed in protected relation completely within the stainless steel tubular portion 200a and within the let portion 70b of the tarp cover arm 70. If desired, the sheave 204 could be provided with sprocket teeth 204a, and instead of a cable 210, a sprocket chain could be provided.

It is important to note that since the spring and adjacent portion of the cable assembly are contained within the tubular portion 200a of the gusset 200 and also within the lower tubular portion of the leg 70b, the spring assembly is protected against weather and damage. The width of the assembly from the bottom rail of the vehicle container is less than three inches, thereby affording a low profile.

Referring now to FIGS. 28–31, a further embodiment of the invention is shown wherein the use of the pivoted tarp cover arm is eliminated, and a simple arrangement is provided having a transversely extending tarp pull bar 370, a manually operable rope 365, and a locking bracket 374 mounted on the rear wall of the vehicle body 360. Referring first to FIG. 28, when the tarp cover 364 is in its closed condition covering the open top of the vehicle body 360, the pull bar member 370 is locked beneath the bracket 374, and the pull rope 365 is wound around a bracket means 374. To uncover the vehicle body 360, the operator merely releases the pull rope 365, and the cover 364 is progressively wound upon the roll 366 which is driven by the motor means M. The roll 366 is supported by roll support 300 provided at the forward end of the cab shield 360a. In this embodiment, rather than being an electrical motor as in the embodiment of FIG. 13, the motor M is a spring motor (such as a spiral spring M as shown in FIG. 28). As the operator releases the pull rope 365, the hold down arm 380 is pivoted in the counter clockwise direction about its spring-biased pivot means 384, and when the pull bar 370 engages the hold-down arm, it is further pivoted in the counter-clockwise direction toward the final position of FIG. 31 with the pull bar 370 being adjacent the tarp cover roll 366. To again cover the vehicle container body 360, the operator merely manually pulls the pull rope 365 as shown in FIG. 31, and as the pull bar 370 progressively is displaced to the rear, the hold-down arm 380 is spring biased in the clockwise direction toward the hold down position of FIG. 28, thereby applying downward tension upon the forward end portion of the cover 364, and thereby tension the same relative to the rear edge 394 of the ledge. The pull rope 365 is then again wound around the locking bracket 374 to fasten the tarp cover 364 in its closed position. As in the embodiment of FIGS. 7 and 10, the transverse portion 380a of the hold-down arm has a length that is less than the spacing distance between the container side walls, whereby the hold-down arm is operable to extend partially within the container as shown in FIG. 28.

While in accordance with the provisions of the Patent Statutes, the preferred forms and embodiments of the invention have been illustrated and described, it will be apparent to those skilled in the art that various changes may be made without deviating from the inventive concepts set forth above.

What is claimed is:

1. A tarp cover system, comprising:
   (a) an open-topped vehicle container body having front, rear, side, and bottom walls, said front, rear, and side walls having upper edges;
   (b) a cylindrical cover roll (66);
   (c) support means (100) for rotatably supporting said cover roll adjacent and parallel with said container body front wall;
   (d) a flexible cover (64) having first and second ends, the length of said cover being at least as great as the length of said container body, said first cover end being connected with said cover roll;
   (e) drive motor means (78) for rotating said cover roll in a first direction to wind said cover on said cover roll;
   (f) a generally U-shaped inverted cover arm (70) having a horizontal transverse portion (70a) adapted to extend transversely across and above said container body, and a pair of downwardly depending leg portions (70b) extending downwardly externally of said container body and terminating in a pair of lower ends, said cover arm transverse portion being parallel with said cover roll and being connected with said second cover end;
   (g) a pair of cover arm pivot means (71) pivotally connecting said pair of lower ends of said cover arm leg portions with said vehicle container body side walls at opposite locations adjacent said container body bottom wall, respectively, said cover arm being pivotally operable between a first position in which said cover arm transverse portion is adjacent said cover roll toward a second position in which said cover arm transverse portion is adjacent said container body rear wall, thereby to uncover and cover said container body, respectively;
   (h) a generally U-shaped inverted hold-down arm means (80) having a horizontal transverse portion (80a) parallel with said cover roll, and a pair of leg portions (80b) extending downwardly from said transverse portion (80a) and terminating in a pair of lower ends;
   (i) a pair of hold-down arm pivot means (84) pivotally connecting said lower ends of said leg portions with said container body adjacent the front wall thereof, respectively, said hold-down arm means horizontal transverse portion (80a) being arranged above said cover, the length of said hold-down arm means horizontal transverse portion being less than the spacing distance between said container body side walls; and
   (j) hold-down spring means (96) biasing said hold-down arm means downwardly toward a hold-down position in which said hold-down arm means horizontal transverse portion extends above said cover when said cover arm means is in said second position said, hold-down arm horizontal transverse portion being contained solely between said container body side walls when said hold-down arm means is in said hold-down position, thereby to hold down the cover adjacent said first cover end.

2. A tarp cover system as defined in claim 1, wherein said hold-down spring means comprises a pair of hold-down springs associated with said hold-down arm pivot means, respectively.

3. A tarp cover system as defined in claim 2, wherein each of said hold-down arm pivot means includes a pivot shaft; and further wherein said hold-down spring means comprises torsion springs mounted concentrically on said pivot shafts, respectively.

4. A tarp cover system as defined in claim 1, wherein each of said pair of leg portions of said hold-down arm means is angularly bent in a plane normal to the transverse portion of said hold-down arm means, said pair of leg portions being so bent to define hold-down arm angularly bent leg portions, so that when said hold-down arm means is in said hold-down position, said hold-down arm means horizontal transverse portion is at a lower elevation than said pair of hold-down arm pivot means.

5. A tarp cover system as defined in claim 4, wherein each of said hold-down arm angularly bent leg portions comprises a pair of pivotally connected sections; and further including locking means for locking said sections in a desired relative angular relation.

6. A tarp cover system as defined in claim 1, wherein said container body front wail includes an upper portion, and further including a horizontal cab shield portion that extends forwardly from said upper portion of said container body front wall; and further wherein said hold-down arm means is pivotally connected with said cab shield portion.

7. A tarp cover system as defined in claim 6, wherein said cab shield portion includes a generally horizontal bottom wall; and further wherein said hold-down arm means is pivotally connected with said cab shield bottom wall.

8. A tarp cover system as defined in claim 7, wherein said cab shield bottom wall includes a rear edge that is parallel with said container body front wall; and further wherein each of said pair of leg portions of said hold-down arm means is angularly bent to cause said hold-down arm means transverse portion (80a) to be at a lower elevation than said cab shield bottom wall, thereby to bend said flexible cover around said cab shield rear edge when said cover arm (70) is in said second position.

9. A tarp cover system as defined in claim 1, and further including cover arm spring means pivotally biasing said cover arm toward the container body rear wall.

10. A tarp system as defined in claim 9, wherein said cover roll is tubular; wherein said cover roll drive motor means includes an electric motor having a stator and a rotor, said rotor extending within one end of said cover roll; and further including bracket means for connecting said stator with the container body.

11. A tarp cover system as defined in claim 10, and further including bearing means for rotatably supporting the other end of said cover roll relative to the container body.

12. A tarp cover system as defined in claim 1, and further including cover arm locking means for automatically locking said cover arm with the container body when said cover arm is in said second position.

13. A tarp cover system as defined in claim 12, wherein said cover arm is sectional and said cover arm transverse (70a) and leg portions (70b) are separate, said cover arm leg portions having free ends; and further including means connecting each end of said cover arm transverse portion for movement relative to the associated cover arm leg portion, respectively, comprising:
(a) a fitting (160) connected with each said cover arm leg portion free end adjacent said cover arm transverse portion, said fitting containing an angularly arranged through bore;
(b) a connecting rod (164) slidably mounted in said through bore, said connecting rod being connected at one end with the adjacent end of said cover arm transverse portion;
(c) locking spring means (174) biasing said connecting rod to displace said cover arm transverse portion away from said cover arm leg portions; and
(d) locking bracket means (170) connected with said container body rear wall upper edge for defining a locking recess facing forwardly of the container body, the angle of inclination ( ) of said through bore being obtuse relative to the axis of the adjacent cover arm leg portion so that as said cover arm approaches said second position, said cover arm transverse portion slidably engages said container body side walls and is biased by said locking spring means toward a locked position within said locking recess.

14. A tarp cover system as defined in claim 1, wherein said cover arm leg portions are hollow; and further including cover arm spring means biasing said cover arm toward said second position; and further wherein said cover arm spring means includes a pair helical springs mounted within said hollow cover arm leg portions, respectively.

15. A tarp cover system as defined in claim 14, wherein said pair of helical springs are compression springs; and further wherein said cover arm spring means includes for each said cover arm leg portion:
(a) a tubular member extending at one end within the adjacent cover arm leg portion;
(b) bracket means for pivotally connecting said tubular member with the associated side wall of the container body;
(c) a piston mounted for movement within said tubular member;
(d) spring seat means defining a spring seat (201) intermediate said piston and said bracket means, said compression springs being mounted intermediate said piston and said spring seat; and
(e) means including a flexible member (210) extending longitudinally through said compression springs for connecting said piston with the adjacent container body side wall.

16. A tarp cover system as defined in claim 1, wherein when said hold-down arm means is in said hold-down position, the elevation of said hold-down arm means transverse portion is lower than the elevation of said upper edges of said container side walls.

17. A tarp cover system:
(a) an open-topped vehicle container body having front, rear, side, and bottom walls, said front, rear, and side walls having upper edges;
(b) a cylindrical cover roll (66);
(c) support means (100) for rotatably supporting said cover roll adjacent and parallel with said container body front wall;
(d) a flexible cover (64) having first and second ends, the length of said cover being at least as great as the length of said container body, said first end being connected with said cover roll;
(e) drive motor means (78) for rotating said cover roll in a first direction to wind said cover toward a wound condition on said cover roll, said cover being operable toward an unwound condition relative to said cover roll in which said cover covers the top of said container body;
(f) a generally U-shaped inverted hold-down arm (80) having a horizontal transverse portion (80a) parallel with said cover roll, and a pair of leg portions (80b) extending normal to said transverse portion and terminating in respective free ends;
(g) a pair of hold-down pivot means (84) for pivotally connecting said leg portion free ends with said container body adjacent the front wall thereof, said hold-down arm transverse portion being arranged above said cover, and the length of said hold-down arm transverse portion being less than the spacing distance between said container body side walls; and
(h) hold-down spring means (96) biasing said hold-down arm downwardly toward a hold-down position in which said hold-down arm transverse portion extends above and holds down said cover adjacent said first end when said cover is in said unwound condition, said hold-down arm transverse portion being contained between said container body side walls when said hold-down arm is in said hold-down position.

18. A tarp cover system as defined in claim 17, wherein said hold-down spring means comprises a pair of hold-down springs associated with said hold-down pivot means, respectively.

19. A tarp cover system as defined in claim 17, wherein each of said pair of hold-down pivot means includes a pivot shaft; and further wherein said hold-down spring means comprise torsion springs mounted concentrically on said pivot shafts, respectively.

20. A tarp cover system as defined in claim 17, wherein the length of said hold-down arm transverse portion is less than the spacing distance between said container body side walls, thereby to permit said hold-down arm transverse portion to extend between said container body side walls when said hold-down arm is in said hold-down position.

21. A tarp cover system as defined in claim 17, wherein said hold-down arm leg portions (80b) are angularly bent to cause said hold-down arm transverse portion (80a) to be at a lower elevation than said hold-down pivot means (84).

22. A tarp cover system as defined in claim 21, wherein each of said hold-down arm leg portions (80b) includes a pair of pivotally connected sections; and further including locking means for locking said pair of sections in a desired relative angular relation.

23. A tarp cover system as defined in claim 17, wherein said container body includes a horizontal cab shield portion (60a) that extends forwardly from the upper edge of said container body front wall; and further wherein said hold-down arm is pivotally connected with said cab shield portion.

24. A tarp cover system as defined in claim 23, wherein said cab shield portion includes a generally horizontal bottom wall (60e); and further wherein said hold-down arm is pivotally connected with said cab shield bottom wall.

25. A tarp cover system as defined in claim 24, wherein said cab shield-bottom wall includes a rear edge (94) adjacent and parallel with said container body front wall; and further wherein said hold-down arm leg portions are angularly bent to cause said hold-down arm transverse portion to be at a lower elevation than said cab shield bottom wall, thereby to bend said cover around the rear edge of said cab shield bottom wall.

26. A tarp cover system comprising:
   (a) an open-topped vehicle container body having front, side, rear, and bottom walls, said front, side, and rear walls having upper edges;
   (b) a cylindrical cover roll (66);
   (c) means (100) for rotatably supporting said cover roll adjacent and parallel with said container body front wall;
   (d) a flexible cover (64) having first and second ends, the length of said cover being at least as great as the length of the container body, said first cover end being connected with said cover roll;
   (e) drive motor means (78) for rotating said cover roll in a first direction to wind said cover on said cover roll toward a wound condition, said cover being operable to be unwound from the roll toward an unwound condition covering said container body;
   (f) a generally U-shaped inverted cover arm (70) having a horizontal transverse portion (70a) adapted to extend transversely across and above said container body, and a pair of downwardly depending tubular leg portions (70b) extending downwardly externally of said container body and terminating in a pair of lower ends, said cover arm transverse portion being parallel with said cover roll and being connected with said second cover end;
   (g) a pair of cover arm pivot means (71) adapted to pivotally connect said pair of lower ends of said cover arm leg portions with said container body side walls at opposite locations adjacent said container body bottom wall, respectively, said cover arm being pivotally operable between a first position in which said cover arm transverse portion is adjacent said cover roll with said cover in said wound condition, toward a second position in which said cover arm transverse portion is adjacent said container body rear wall, and said cover is in said unwound condition thereby to uncover and cover said container body, respectively; and
   (h) cover arm biasing means biasing said cover arm toward said second position, including for each of said pair of cover arm leg portions:
      (1) a tubular member having a first end extending concentrically within said cover arm leg portion (70b);
      (2) means connecting said tubular member with said container body side wall for pivotal movement about a pivot axis;
      (3) a piston (212) mounted for longitudinal displacement within said cover arm leg portion;
      (4) means defining a spring seat (201) on said tubular member;
      (5) a helical compression spring (208) mounted concentrically within said cover arm leg portion intermediate said piston and said spring seat; and
      (6) means including a flexible member (210) extending longitudinally through said compression spring for connecting said piston with said container body side wall.

27. A tarp cover system comprising:
   (a) an open-topped vehicle container body including front, rear, side, and bottom walls, said front, rear, and side walls having upper edges;
   (b) a cylindrical cover roll (66);
   (c) support means (100) for rotatably supporting said cover roll adjacent and parallel with said container body front wall;
   (d) a flexible cover (64) having first and second ends, the length of said cover being at least as great as the length of the container body, said first cover end being connected with said cover roll;
   (e) drive motor means (78) for rotating said cover roll in a first direction to wind said cover on said cover roll toward a wound condition, said cover being operable toward an unwound condition covering said container body;
   (f) a generally U-shaped inverted sectional cover arm (70) having a horizontal cover arm transverse section (70a) extending transversely across and above the container body, a pair of vertical leg sections 70(b) arranged externally of the side walls of said container body, respectively, said cover arm leg sections having upper ends adjacent said cover arm transverse section, and a pair of lower ends, said cover arm transverse section being parallel with said cover roll and being connected with said second cover end, said cover arm transverse section being separate from said cover arm leg sections, and means for movably connecting each of said upper ends of said cover arm leg sections to said cover arm transverse section, including:
      (1) a fitting (160) connected with said upper end of said cover arm leg section, said fitting containing an angularly arranged through bore (162);
      (2) a connecting rod (164) slidably mounted in said through bore, said connecting rod having a first end connected with said cover arm transverse section; and
      (3) locking spring means (174) biasing said connecting rod to displace said cover arm transverse section away from said cover arm leg sections;
   (g) a pair of cover arm pivot means (71) pivotally connecting said pair of lower ends of said cover arm leg sections with said container body side walls, respectively, said cover arm being pivotally operable between a first position in which said cover arm transverse section is adjacent said cover roll toward a second position in which said cover arm transverse section is adjacent said container body rear wall, thereby to uncover and cover the container body, respectively;
   (h) means for pivoting said cover arm between said first and second positions; and
   (i) cover arm locking means for automatically locking said cover arm with said container body when said cover arm is in said second position, said cover arm locking means including locking bracket means (76) mounted adjacent the upper edge of said container body rear wall for defining a locking recess facing forwardly of said container body, the angle of inclination ( ) of said through bore being obtuse relative to the axis of the associated cover arm leg section so that as said cover arm approaches said second position, said cover arm transverse section slidably engages the container body side walls and is biased by said locking spring means toward a locked position within said locking recess.

* * * * *